May 1, 1928. 1,667,923
H. J. BISHOP
APPARATUS FOR TREATING SOIL
Filed Nov. 10, 1923
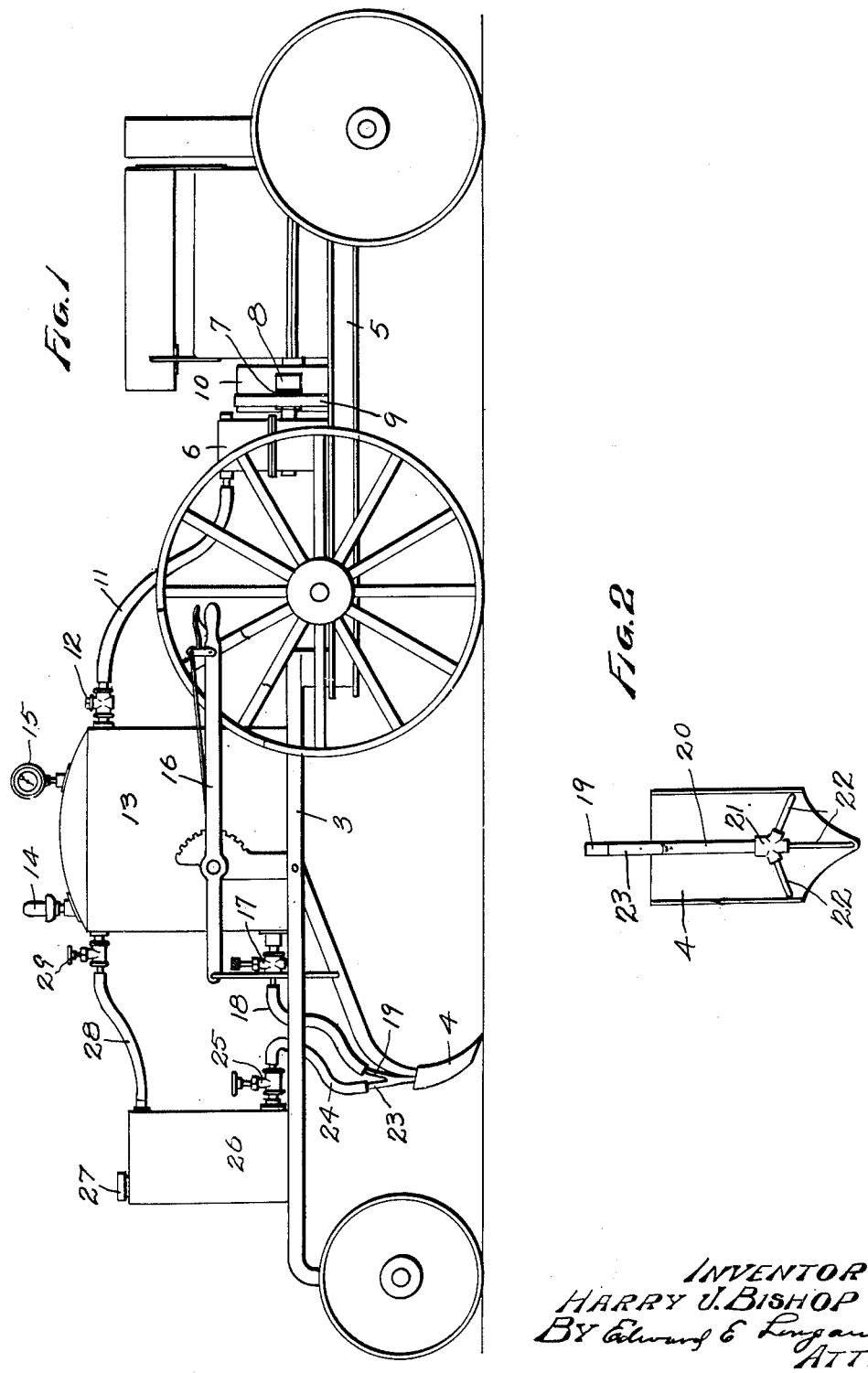
INVENTOR
HARRY J. BISHOP
BY Edward E. Longan
ATTY.

Patented May 1, 1928.

1,667,923

UNITED STATES PATENT OFFICE.

HARRY J. BISHOP, OF KANSAS CITY, MISSOURI.

APPARATUS FOR TREATING SOIL.

Application filed November 10, 1923. Serial No. 673,887.

My invention relates to improvement in apparatus for treating soil and has for its primary object an apparatus by which air is injected into and trapped by the soil during its cultivation whereby the soil is not only enabled to absorb nitrogen from the air so entrapped but the oxygen in the air hastens the decomposition of vegetable matter and the soil is rendered more porous so that surface baking and the absorption of moisture from the sub-soil by the action of the sun, is prevented.

A further object is to aerate the soil during cultivation or plowing by the introduction of atmospheric air under pressure which leaves the soil in a porous condition and prevents light frosts from entering the soil and killing seed germs. This aeration also removes acidity of the soil.

A further object is to ventilate and aerate the roots of growing crops and in connection with the absorption of nitrogen by the soil from the air so introduced to fertilize the plants and increase the quality and quantity of crop production.

A still further object is to ventilate and aerate the surface soil of land which has become waterlogged from extended irrigation and permit the same to be dried sufficient for crop production.

A still further object is to introduce into the soil while being cultivated in addition to air under pressure, fertilizers or poisons either in powdered or liquid form, the poison intended to kill root destroying insects and also such insects as hibernate in the ground, while the fertilizer thus distributed can be readily absorbed by the ground and does not depend upon surface fertilization and plowing under or upon the rain dissolving the fertilizer and penetrating the soil in that manner; in other words, plant parasites which thrive in the ground or hibernate therein can be destroyed by my apparatus.

In the drawings:—

Fig. 1 is a side elevation of an agricultural implement which stirs up the soil with my improvement attached thereto and illustrating the same as drawn by a tractor; and Fig. 2 is a plan view of one form of nozzle employed.

In carrying out my invention I employ an agricultural implement 3 which is provided with the usual soil penetrating means 4. These soil penetrating means may be either a plow, harrow, cultivators or other devices used in preparing or seeding of the soil for the planting of crops or cultivating the same.

The implement as shown may be drawn by a tractor 5 on which is mounted an air compressor 6. The air compressor 6 may be supplied with tight and loose pulleys 7 and 8 over which passes a belt 9, which belt is driven by means of the fly-wheel 10. The object of using tight and loose pulleys is that the belt 9 may be shifted so as to stop the operation of the pump 6. Secured to the pump 6 is a conduit 11 which is attached to a check valve 12, and this valve being in turn secured to an air reservoir 13. The air reservoir is provided with a safety valve 14 which can be set so as to regulate the pressure in the reservoir and a pressure gauge 15. A handle 16 is provided by means of which the blade of the agricultural implement which enters the ground can be raised or lowered. Secured to the reservoir 13 is a needle valve 17 by means of which the flow of air from the reservoir can be regulated. Secured to the valve 17 is a flexible conduit 18 which is secured to the branch 19 of a nozzle 20. The nozzle 20 terminates in a fitting 21 which is adapted to receive pipes 22, these pipes are provided with outlets to permit the air to escape. The nozzle 20 is also provided with a branch pipe 23 to which is attached a flexible conduit 24. This conduit is in turn secured to a valve 25 which is secured to a container 26. Access to the container 26 is had by means of a cap 27. The container 26 is adapted to hold either fertilizer or a poison which may be in liquid or powdered form and in order to force the same from the container, a conduit 28 is employed which is connected to the reservoir 13 so as to permit the passage of air, the passage of air however, is controlled by means of a valve 29.

While I have shown my device as being drawn by a tractor which carries an air pump it is obvious that by removing the connection of the conduit 11 I may employ a separate air compressing station and charge the reservoir 13 at that point, and utilize either horse-power or in small gardens, the ordinary cultivating tools which are pushed by hand and accomplish my purpose.

In addition to introducing the air during the cultivation or stirring up of the soil, the same can also be used to advantage while planting seed, because it is my opinion, that by introducing air into the soil and adjacent the seed at the time that it is planted the germination thereof will be hastened and with the introduction of fertilizer can be still more hastened, and if a poison is mixed with the fertilizer, parasites will be eliminated at the same time.

It is thought that by the use of my apparatus soils can be readily and quickly rendered more fertile, seeds germinated more quickly and protected from frosts and a great many of the parasites which might prey on farm products, be eliminated and killed before their destructive propensities assert themselves, thus assuring the farmer of cleaner crops, than would be possible without the use of my process.

By my apparatus the fertilizer or poison is more thoroughly, evenly and quickly introduced into the soil either in cultivating or planting, or as previously pointed out, I may employ a mixture of fertilizing and insect destroying mediums.

It will further be observed that by means of the valves 17 and 25 I can treat the soil with air under pressure alone or I can treat it simultaneously with air under pressure and the fertilizer or poison or mixture of the same.

I may also by closing off the valve 17 and opening the valves 25 and 29 forcibly eject the contents of the container 26 without mixing any air with these contents during the passage from the nozzle.

It is obvious that my device may have various forms of nozzles which may be employed for introducing the air under pressure and also the fertilizer or poison. In hard soils a form of nozzle may be employed for introducing these agents even without breaking up of the soil. I have found this very satisfactory in treating soils close to the trunks of trees, vines, etc.

The volume of air delivered at a given pressure is controlled by means of the needle valve 17, while the pressure in the tank 15 is regulated by setting the safety valve 14 so that it will blow off at any predetermined tank pressure.

The quantity of fertilizer or poison ejected in the tank 26 may also be regulated as to quantity by means of the valves 25 when fed by gravity and by means of the valves 25 and 29 when pressure feed is employed.

It will be noted from Fig. 2 that the nozzles 22 are arranged at different levels or different horizontal planes so that both the air and the fertilizer or poison will be injected into the earth or the furrow being plowed at different levels or horizontal planes.

Having fully described my invention, what I claim is:—

An apparatus for treating soils comprising a wheeled implement, a plow carried by said implement for penetrating and stirring the soil, a compressed air reservoir carried by said implement, means for supplying air under pressure to said reservoir, means for regulating the pressure in said reservoir, a fertilizer reservoir carried by said implement, means for supplying pressure to said fertilizer reservoir, a nozzle having openings at different levels therein secured to the rear of the plow, a plurality of radially extending pipes carried by said nozzle, said pipes being secured in the openings of the nozzle, a flexible connection between the air reservoir and the nozzle, valve controlled means for regulating the flow of air through said connection, a flexible connection between the fertilizer reservoir and said nozzle, and valve controlled means for regulating the flow of fertilizer through said last mentioned flexible connection.

In testimony whereof, I have signed my name to this specification.

HARRY J. BISHOP.